Patented Nov. 13, 1934

1,980,441

UNITED STATES PATENT OFFICE 1,980,441

RESINOUS METAL COMPOUNDS

Paul Lawrence Salzberg, Wilmington, Del., assignor to E. I. du Pont de Nemours & Company, Wilmington, Del., a corporation of Delaware No Drawing. Application November 19, 1930,
Serial No. 496,814

19 Claims. (Cl. 260—8)

This invention relates to new organic compounds and more particularly to metallic derivatives of acid esters in which the ester grouping comprises a polyhydric alcohol, and to coating compositions containing these metallic derivatives.

It is known that a polyhydric alcohol and a polybasic acid may be reacted together to produce a resin. Modifying agents, such as drying oils or the corresponding oil acids, are usually incorporated into the resin during the process of manufacture in various ways understood to those skilled in the art, in order to impart solubility to these resins and make them more suitable for use in coating compositions. These resins are, however, nearly neutral products of low acid number as their method of formation necessitates the presence of the glycerol in an amount sufficient to esterify the carboxyl groups of the polybasic acid molecule. Thus, if a dibasic acid is used, each of the two carboxyl groups is esterified by a polyhydric alcohol molecule and the molecules thus formed react through their alcoholic constituents with another molecule of the dibasic acid to esterify both carboxyl groups thereof, thus building up a large molecule which is regarded as a characteristic of resins. Certain resins of moderately high acidity have been treated with metal oxides to reduce the acidity or accelerate hardening, but to my knowledge no polybasic acid-polyhydric alcohol resin has hitherto been prepared in which a substantial portion of the polyhydric alcohol is replaced by a metal. I have discovered, however, that the reaction between the polyhydric alcohol and polybasic acid can be conducted so as to esterify less than the total number of carboxyl groups, thus leaving a free carboxyl group for the production of metal salts of the acid ester. I have found these metal ester salts, in which the ester grouping comprises a polyhydric alcohol, to be useful in the arts as will more fully appear.

This invention has as an object the production of new compounds comprised of the metal salts of acid esters in which the ester grouping comprises a polyhydric alcohol. A further object resides in improved processes for manufacturing these new compounds. A still further object resides in the production of coating compositions comprising these compounds. Other objects will appear hereinafter.

These objects are accomplished by the following invention wherein a polyhydric alcohol is reacted with a polybasic acid under conditions which result in the formation of an acid ester rather than a neutral resin. The acid ester is then reacted with a compound of a metal capable of forming the metal salt of the ester.

With respect to the following formulæ which are submitted as illustrative of the type of compounds with which the present invention is concerned, it is to be understood that the ester constituent may comprise not only glycerol, but any other polyhydric alcohols, including glycols, and compounds having more than three hydroxyl groups, and that polybasic acid radicals other than phthalic may be present.

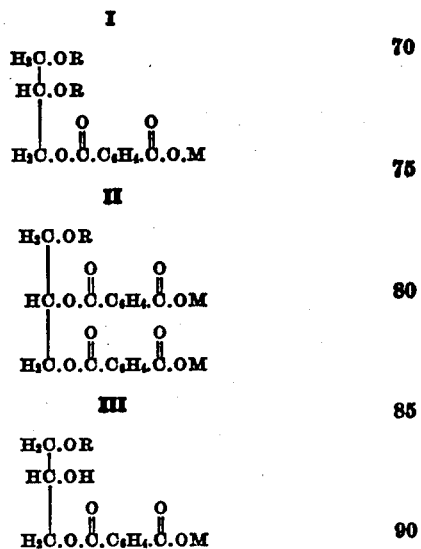

In the above formulæ M represents a metal and R a modifying or solubilizing group which adapts the product for use in coating compositions.

It is to be understood that the monobasic acid radical mentioned in the claims refers to those modifying groups known by those skilled in the art to be solubilizing or modifying groups for polyhydric alcohol-polybasic acid resins. As examples of suitable modifying groups may be mentioned those derived from the oils of the drying or semidrying type, and from the corresponding oil acids as well as from other suitable fatty acids. Rosin and the resin acids derived from rosin and natural resins are also suitable. These modifying groups lend desirable solubility and film forming properties to the compounds indicated above and should be present when it is desired to use the compounds as constituents in coating compositions.

In making the new compounds I preferably react the polyhydric alcohol, in which the hydrogen atom of at least one of the hydroxyl groups is replaced with a modifying group, with a dibasic acid anhydride in excess of the amount required to produce a neutral resin. In the case of oil modified resins I prefer to first carry out an ester interchange between the polyhydroxy alcohol and the glyceride of the oil and then esterify this material with the anhydride of the dibasic acid. The triglyceride or oil is heated with glycerol until solution takes place, or in other words until the two phases merge into a single phase. This procedure produces the mono- or di-glyceride or a mixture thereof.

The reaction between two molecules of oil and one molecule of glycerol for the production of the diglyceride may be represented as follows:

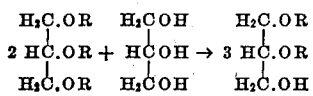

The monoglyceride, from which the compound indicated by Formula II is obtained, may be made in the same manner by reacting one molecule of the oil with two molecules of the glycerol.

The product obtained by heating the glyceride with phthalic anhydride may be indicated by the following equation:

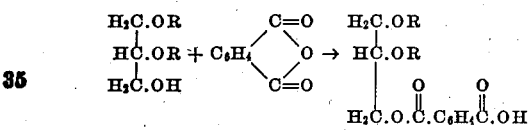

The polybasic acid or anhydride is present in excess of the amount required to form a neutral ester or resin (unless the invention is practiced by using a narrower temperature range at this point as will more fully appear) so as to insure the presence of a substantial amount of the half-acid ester, indicated above, from which the metal salt may be obtained through interaction of the free carboxyl group with a metal compound. Thus, in the reaction between the di-glyceride and phthalic anhydride indicated above, less than two molecules of the glyceride must be present for each molecule of the dibasic acid anhydride; otherwise both carboxyl groups will be esterified and a neutral resin produced.

As will be understood by those skilled in the art, each additional free hydroxyl group in the polyhydric alcohol, or the substituted polyhydric alcohol, with which the polybasic acid is reacted, requires a proportionately larger quantity of acid. The reference to a substituted polyhydric alcohol is intended to designate those polyhydric alcohols in which one or more of the hydroxyl groups have their hydrogen atoms replaced by one of the modifying groups previously referred to.

For use in coating compositions it is desirable to use the heavy metal salts of the acid esters, and to obtain these metal salts I prefer to dissolve the acid ester in an organic solvent and neutralize with caustic alkali to form the alkali metal salt, after which an aqueous solution of a water soluble heavy metal salt is added. The metal derivative may be used as precipitated, or it may be dissolved in an organic solvent, freed from water, and filtered from impurities. I prefer to have the organic solvent present during the precipitation, so that the metal-resin is dissolved as rapidly as it forms. The heavy metal salt may also be obtained by refluxing the solution of the acid ester, in organic solvent, with a metal hydroxide.

My new compounds are believed to be accurately referred to as the metal ester salts of polybasic acids in which the alcohol constituent of the ester grouping comprises a monobasic acid ester of a polyhydric alcohol. These compounds, nevertheless, may also be referred to as the metal salts of high acid resins, even though complete resinification phenomena is not apparent; because the term resin, as conventionally used, is sufficiently elastic to cover these reaction products referred to herein, of polyhydric alcohols and polybasic acids. By high acid resins I mean resins having an acid number of about 75 or more as compared with the usual polyhydric alcohol-polybasic acid resins having an acid number ranging from zero to about 50. Having further reference to the resinous characteristics of my new compounds it is to be observed that the metal salts of the acid esters are definitely resinous. Furthermore, the reaction between the polyhydric alcohol and the polybasic acid may be so conducted as to result in a polyhydric alcohol-polybasic acid resin containing an amount of the acid-ester type of molecule sufficient to permit the incorporation of an appreciable quantity metal by chemical interaction between the free carboxyl groups and a metal compound. These resinous compounds being compatible with nitrocellulose coating compositions, offer a convenient method of incorporating metals in such coating compositions for purposes referred to hereinafter.

My preferred mode of procedure, as indicated by the following eleven examples is to heat the substituted polyhydric alcohol, preferably a mono- or di-glyceride, or mixtures thereof with an excess of phthalic anhydride. It is also preferred, as indicated in Examples 1-7, 9, and 13 to form the mono- or di-glyceride by heating a triglyceride (an oil of the drying or semi-drying type) with glycerol.

It is preferable to use the anhydride of a polybasic acid, and particularly the anhydride of dibasic acid, rather than the acid itself. When the acid is used there is a greater tendency for all of the carboxyl groups to enter into the reaction causing the formation of a mixture of substances. If it is desired to isolate the acid ester from the mixture, the separation is effected with some difficulty. It is to be understood, therefore, that the more generic term polybasic acid as used in the claims refers more particularly to the acid anhydride as the preferred form of the acid.

*Example 1*

Six hundred and twenty grams of linseed oil and 31 grams of glycerol are heated for ½ hour at 250° C. in the presence of a trace of litharge or alkali as a catalyst. The resulting dilinseed glyceride is then esterified with 148 grams of phthalic anhydride by heating for ½ hour at 140° C. There is then formed the phthalic half-acid ester of dilinseed glyceride having an oil content of approximately 75%. This material is dissolved in alcohol and neutralized with sodium hydroxide or potassium hydroxide and treated with an equivalent amount of a metal salt. The addition of ferric chloride gives a soft, curdy, red precipitate of the ferric linseed resin. The addition of copper sulfate gives a blue-green oily precipitate of the copper linseed resin. Similarly cobalt nitrate gives a dark purple resin, and ceric sulfate gives a light yellow oily product.

Example 2

Six hundred and forty-six grams of cottonseed oil and 31 grams of glycerol are heated for two hours at 250° C. in the presence of one gram of litharge. One hundred and forty-eight grams of phthalic anhydride are added and the mixture heated 45 minutes at 160° C. The product is suspended in alcohol, neutralized with alkali, and treated with an equivalent amount of ceric sulfate. The ceric cottonseed resin is formed as a light yellow soft precipitate which can be purified by dissolving it in toluol, drying the solution, and filtering. This ceric salt of the phthalic half-acid ester of dicottonseed glyceride has an oil content of approximately 75%.

Example 3

Six hundred and forty-six grams of China-wood oil and 31 grams of glycerol are heated for 1½ hours at 200° C. in the presence of $\frac{1}{10}$ grams of sodium hydroxide. This product is esterified with 135 grams of phthalic anhydride by heating for 1½ hours at 150° C. The ceric salt of this product is a soft, yellow resin which dries rapidly at room temperature. The ferric salt is reddish brown in color. This example refers to metal salts of the phthalic half-acid ester of di-China-wood glyceride having an oil glyceride content of about 75%.

Example 4

Three hundred and twenty-three grams of China-wood oil and 61 grams of glycerol are heated for 1½ hours at 200° C. in the presence of $\frac{1}{10}$ grams of litharge. Two hundred and ninety-six grams of phthalic anhydride are added and the mixture heated at 140–150° C. for two hours. The resulting phthalic acid ester of monowood oil glyceride may be converted into metallic derivatives according to the usual procedure. The ceric salt of the phthalic half-acid ester of mono-China-wood oil glyceride so produced has an oil glyceride content of 43% and is a soft, light yellow resin readily soluble in butyl alcohol and toluol.

Example 5

Three hundred grams of cottonseed oil and 63 grams of glycerol are heated for two hours at 225° C. using $\frac{1}{10}$ grams of litharge as a catalyst. This monocottonseed glyceride is esterified with 296 grams of phthalic anhydride by heating two hours at 150° C. This ceric salt of the phthalic half-acid ester of monocottonseed glyceride has an oil glyceride content of 41% and is a light yellow, slow drying resin.

Example 6

This example illustrates the preparation of a metallic derivative of a resin prepared from a blown oil. The particular example is the ceric salt of the phthalic half-acid ester of diblown China-wood glyceride having an oil glyceride content of about 75%. The blown oil was prepared by passing air through the raw oil for eight hours at 100° C. Two hundred and fifteen grams of blown China-wood oil and 10 grams of glycerol are heated for ½ hour at 200° C. in the presence of 0.2 grams of litharge. This product is very sensitive to gelation and can be best esterified by heating with phthalic anhydride in a solvent. The diblown wood oil glyceride is therefore dissolved in 500 cc. of toluol and refluxed for ½ hour with 49 grams of phthalic anhydride. Two hundred and fifty cc. of butyl alcohol is added and the solution neutralized with aqueous potassium hydroxide. An equivalent amount of ceric sulfate is added to form a solution of the ceric blown wood oil resin, which is separated from the aqueous layer and filtered.

Example 7

This example describes the preparation of a metal resin directly from the phthalic half-acid ester of dilinseed glyceride by refluxing it with ferric hydroxide. One thousand nine hundred and thirty-six grams of linseed oil and 92 grams of glycerol are heated for ½ hour at 200° C. using two grams of litharge as a catalyst. This product is esterified by heating for one hour at 140° C. with 424 grams of phthalic anhydride. One hundred and eighty-six grams of the resulting product is dissolved in 200 cc. of toluol and refluxed for two hours with ferric hydroxide freshly prepared from 18 grams of ferric chloride and 8 grams of sodium hydroxide. Analysis of the filtered solution showed that the ferric linseed resin contained 1.62% metallic iron.

Example 8

This example describes the preparation and properties of a metal resin containing glycol instead of glycerol. The particular derivative described is the ceric salt of the phthalic half-acid ester of mono-China-wood glycollate. Three hundred twenty grams of China-wood oil acids and 62 grams of glycol are heated under a reflux for five hours at 185° C. One hundred forty-eight grams of phthalic anhydride is added and the mixture is heated one hour at 150° C. with stirring. The product is dissolved in 500 cc. of butyl alcohol, neutralized with caustic soda, mixed with 500 cc. of toluol, and treated with an aqueous solution of ceric sulphate prepared from 65 grams of hydrated ceric oxide and 50 grams of sulphuric acid. The product, after drying and filtering, is reddish brown in color and gives rapid drying films having a frosted or crinkled appearance.

Example 9

This example illustrates the preparation of the lead salt of the phthalic half-acid ester of dicottonseed glyceride. Six hundred and forty-six grams of cottonseed oil are heated to 200° C., then mixed with one gram of caustic soda and heated to 250° C. At this temperature 46 grams of glycerol is added and the heating is continued for one hour at 250° C. One hundred and forty-eight grams of phthalic anhydride is added and the mixture heated for one hour at 150° C. The product is dissolved in 500 cc. of butyl alcohol, neutralized with 40 grams of caustic soda, and then mixed with 1000 cc. of butyl acetate. An aqueous solution containing 165 grams of lead nitrate is then added with stirring. The resulting solution of the lead salt of the acidic resin is purified by drying over anhydrous sodium sulfate and filtered.

Example 10

The copper salt of the phthalic half-acid ester of glycerol diresinate may be prepared as follows: Seven hundred and seventy-six grams of rosin and 94 grams of glycerol are heated together between 200° C. and 250° C. until the product is practically neutral. One hundred and forty-eight grams of phthalic anhydride is then added and the mixture heated for one hour at 175–180° C. This product is neutralized with caustic soda in alcohol solution and treated with 125 grams of copper sulphate in water. The copper derivative is soluble in organic solvents, and its solutions form clear, blue-green hard films.

*Example 11*

This example illustrates the preparation of a metal salt of the phthalic half-acid ester of dicottonseed glyceride in which the dicottonseed glyceride is prepared by direct esterification of glycerol with two mols of cottonseed oil acids instead of using ester interchange. Five hundred and seventy-eight grams of doubly distilled cottonseed oil acids and 92 grams of glycerol are heated together for 5 hours at 250° C., after which time the product is practically neutral. This product is esterified with 148 grams of phthalic anhydride by heating for 1½ hours at 150° C. This phthalic acid ester of dicottonseed glyceride may be converted into metallic salts according to the usual procedure outlined above. The ceric salt is a brown resinous product.

*Example 12*

This example describes the preparation of a metal salt of an acidic polyhydric alcohol-polybasic acid resin by the ordinary fusion method, but using, as in the above examples, an amount of polybasic acid in excess of the amount required to form a neutral resin. The resin is prepared by heating at 225° C. 19.69 parts of glycerol, 53.05 parts of phthalic anhydride, and 27.26 parts of doubly distilled cottonseed oil acids until the product has an acid number of approximately 100. This requires from two or three hours. One hundred grams of this product is dissolved in butyl alcohol, neutralized with sodium hydroxide to form the sodium salt from which the ferric salt of the resin is obtained by treating with an aqueous solution containing 18 grams of ferric chloride. The resulting solution is dried over anhydrous sodium sulphate and filtered from insoluble material. The product is reddish brown in color and contains about 4% of iron. A 35% solution of this product in butyl alcohol is clear and non-viscous, but it is unstable and gives somewhat cloudy films.

The esterification with phthalic anhydride proceeds most readily between 140° and 150° C., but variations between 100° and 250° C, may be employed when practicing the invention according to the above procedure wherein the polybasic acid is present substantially in excess of the amount required for complete neutralization by the substituted polyhydric alcohol.

It is possible, however, to produce the acid esters above described by using the polyhydric alcohol in neutralizing amounts or in excess thereof, provided an anhydride is used, particularly a dibasic anhydride, and provided that the temperature used is sufficiently high to cause the anhydride ring to open for the formation of the half-acid ester, but is not high enough to cause the free carboxyl group of the half-acid ester to react with another molecule of the excess alcohol, or substituted alcohol present and thereby cause the formation of a neutral resin. This temperature, when reacting phthalic anhydride with a glyceride ranges from about 100° C. to 150° C.

By reacting a polyhydric alcohol having more than one free hydroxyl group, as a monoglyceride, with a dibasic acid anhydride and keeping the temperature low enough to prevent interaction of the acid ester produced with another alcoholic molecule, which at the same time prevents interaction between the free carboxyl group and the free hydroxyl group of the same molecule, it is possible to produce an acid ester containing one or more free hydroxyl groups from which metal derivatives of the type indicated by Formula III may be obtained. The following example illustrates the preferred method of forming this type of metal derivative.

*Example 13*

This example illustrates the preparation of a metal derivative or resin as above referred to, using an excess of glycerol over and above that required for the formation of the half-ester of phthalic acid, thus leaving free hydroxyl groups in the finished product. Three hundred grams of cottonseed oil and 99.2 grams of glycerol are heated to 225° C. and then mixed with 0.5 grams of litharge. The heating is continued at 225° C. for two hours with stirring and blowing with carbon dioxide. Two hundred and eighty-seven grams of phthalic anhydride is added and the heating continued for one hour at 150° C. The product is dissolved in butyl alcohol, neutralized with sodium hydroxide, and heated with a solution of ceric sulphate prepared from 130 grams of hydrated ceric oxide and 100 grams of sulphuric acid. After purification from water and insoluble matter, a light brown solution of the ceric salt is obtained. The composition of the finished product is as follows:

| | Percent |
|---|---|
| Ceric glyceryl phthalate | 55 |
| Cottonseed glyceride | 40 |
| Excess glycerol | 5 |
| | 100 |

In place of phthalic anhydride, I may use succinic, malic, maleic, fumaric, tartaric, adipic, or citric acids. As the polyhydric alcohol, propylene glycol, butylene glycol, diglycerol or pentaerythrite might be used in place of glycerol or glycol. The modifying constituent may be any high molecular weight acid capable of conferring solubility, such as the acids obtained from soya bean oil, fish oil, perilla oil, coconut oil, corn oil, or oleic acid, in addition to the drying and semi-drying oils given in the examples. The metallic constituent may be any element which is sufficiently basic to form an organic salt. This includes particularly lithium, sodium, potassium, copper, magnesium, zinc, cadmium, barium, mercury, neodymium, aluminum, titanium, zirconium, tin, cerium, lead, thorium, vanadium, bismuth, chromium, uranium, manganese, iron, cobalt, and nickel.

With reference to the heavy metal derivatives, especially suitable for use in coating compositions, the heavy metals may be designated as including practically all metals except the alkali and alkaline earth metals. These metal compounds are film-forming resins and may be used as varnish bases, or as vehicles for paints or enamels. The metal-China-wood oil resins dry rapidly and in some cases lead to films having a frosted appearance which are useful, for example, in crinkle varnishes. The metal-linseed resins and metal-cottonseed resins are slower drying and give clear transparent finishes.

These metal resins are compatible with nitrocellulose in a wide range of proportions. Examples of their use in nitrocellulose lacquers are as follows:

Example 14

| | Parts |
|---|---|
| Nitrocellulose | 40 |
| Ferric linseed resin of Example 1 | 10 |
| Solvent as required | |

This composition gives clear, reddish brown, fast drying films.

Example 15

| | Parts |
|---|---|
| Nitrocellulose | 10 |
| Ceric cottonseed resin of Example 2 | 10 |
| Solvent as required | |

Films prepared from this lacquer are light yellow in color.

Several advantages accrue to the incorporation of metals in resins. Probably the most important of these is the fact that the presence of the metal reduces the transparency of the polyhydric alcohol-polybasic acid resins to ultraviolet light. The ferric, copper, cobalt, vanadium, cerium, and titanium derivatives are particularly effective in this regard. This property is of advantage in the preparation of nitrocellulose lacquers because the absorption of the ultraviolet rays by the metal-resin increases the durability of the nitrocellulose film to sunlight. Furthermore, lacquers of this type have a general usefulness as ultraviolet filters whenever it is desirable to obtain protection from sunlight. The following table records the ultraviolet transmissions of nitrocellulose films containing a number of these metallic resins.

It is desirable in some instances to incorporate more than one metal in the resin. Thus, iron has a greater retarding value for ultraviolet light than titanium, but the iron colors the film whereas the titanium compound yields a clear film. Through the combination of both metals the desired opacity to ultraviolet light with minimum coloration may be obtained.

| Metal-resin | Nitrocellulose resin ratio | Transmission at 3130 A. U. |
|---|---|---|
| | | Percent |
| Nitrocellulose alone (control) | | 53.0 |
| Ferric linseed oil resin of (Ex. 1) | 4/1 | 30.0 |
| Ceric Wood oil resin of (Ex. 3) | 1/2 | 8.0 |
| Ceric cottonseed resin of (Ex. 5) | 1/2 | 2.0 |
| Titanium-iron cottonseed resin | 1/2 | 1.5 |

A further advantage of these resins containing drying oils is that the presence of the metal accelerates the drying rate of the oil. This is particularly true of the cobalt, manganese, iron, copper, cerium, lead, and vanadium derivatives. Thus, for example, a lacquer comprising four parts of the ceric wood oil resin to one part of nitrocellulose dries hard in less than six hours, whereas a similar lacquer containing the corresponding non-metallic polybasic acid-polyhydric alcohol requires about 16 hours for drying.

As many apparently widely different embodiments of this invention may be made without departing from the spirit and scope thereof, it is to be understood that I do not limit myself to the specific embodiments thereof except as defined in the appended claims.

I claim:

1. A process which comprises forming an acid ester by heating a polyhydric alcohol, having the hydrogen atom of at least one hydroxyl group replaced by a monobasic organic acid radical, with a polybasic organic acid in proportion to form the acid ester, and thereafter neutralizing the acid ester with a compound of a metal capable of forming the metal salt thereof, said acid radical being that of an acid selected from the group consisting of fatty oil acids and resin acids.

2. A process which comprises forming an acid ester by heating a polyhydric alcohol, having the hydrogen atom of at least one hydroxyl group replaced by a monobasic organic acid radical, with a polybasic organic acid in proportion to form the acid ester, dissolving the acid ester in an organic solvent, and thereafter reacting therewith a metal hydroxide, said acid radical being that of an acid selected from the group consisting of fatty oil acids and resin acids.

3. A process which comprises forming an acid ester by heating a polyhydric alcohol, having the hydrogen atom of at least one hydroxyl group replaced by a monobasic organic acid radical, with a polybasic organic acid in proportion to form the acid ester, dissolving the acid ester in an organic solvent, reacting therewith an alkali metal hydroxide, and adding to the solution thus obtained an aqueous solution of a heavy metal salt, said acid radical being that of an acid selected from the group consisting of fatty oil acids and resin acids.

4. A process which comprises forming an acid ester by heating a polyhydric alcohol, having the hydrogen atom of at least one hydroxyl group replaced by a monobasic organic acid radical, with a polybasic organic acid in proportion to form the acid ester, forming the alkali metal salt of the acid ester, and reacting the alkali metal salt with a soluble inorganic compound of a heavy metal, said acid radical being that of an acid selected from the group consisting of fatty oil acids and resin acids.

5. A process which comprises heating a polyhydric alcohol and a modifying agent with a polybasic organic acid in proportion to form the acid ester, and thereafter neutralizing with the partial ester so formed a compound of a metal capable of forming the metal salt thereof, said modifying agent being selected from the class consisting of fatty oil acids, fatty oils and resin acids.

6. A process which comprises heating a polyhydric alcohol and a modifying agent with a polybasic organic acid in proportion to form the acid ester, dissolving the acid ester so formed in an organic solvent, reacting therewith an alkaline metal hydroxide, and adding to the solution thus obtained an aqueous solution of a heavy metal salt, said modifying agent being selected from the class consisting of fatty oil acids, fatty oils and resin acids.

7. A process which comprises heating a polyhydric alcohol, in which at least one of the hydroxyl groups has its hydrogen atom replaced by a monobasic organic acid radical, with a dibasic organic acid anhydride in proportion to form the acid ester, and thereafter neutralizing the acid ester so formed with a compound of a metal capable of forming the metal salt thereof, said acid radical being that of an acid selected from the group consisting of fatty oil acids and resin acids.

8. A process which comprises heating a glyceride having at least one free hydroxyl group with a dibasic organic acid anhydride in proportion to form the half ester, and thereafter reacting the half-acid ester of the glyceride so formed with a compound of a metal capable of forming the metal salt thereof, said glyceride being selected from the class consisting of fatty oil acid glycerides and resin acid glycerides.

9. A process which comprises heating a polyhydric alcohol with an oil of the drying or semi-drying type until the two phases merge into a single phase, heating the product formed with a polybasic organic acid in proportion to form the acid ester, and thereafter reacting the partial ester thus produced with a compound of a metal capable of forming the metal salt thereof.

10. A process which comprises heating glycerol with an oil of the drying or semi-drying type until the two phases merge into a single phase, heating the product formed with phthalic anhydride in proportion to form the half ester, and thereafter reacting the half ester thus formed with a compound of a metal capable of forming the metal salt thereof.

11. A process which comprises heating a polyhydric alcohol, in which the hydrogen atom of at least one hydroxyl group is replaced by a monobasic organic acid radical, with a dibasic organic acid anhydride at a temperature below the point at which resinification takes place and in proportion to form the acid ester, and thereafter reacting the acid ester thus formed with a compound of a metal capable of forming the metal salt thereof, said acid radical being that of an acid selected from the group consisting of fatty oil acids and resin acids.

12. A process which comprises heating an excess of polyhydric alcohol, in which the hydrogen atom of at least one hydroxyl group is replaced by a monobasic organic acid radical, with a dibasic organic acid anhydride at a temperature below the point at which resinification takes place and thereby forming the half ester of the dibasic acid, and thereafter reacting the half ester thus formed with an inorganic compound of a metal capable of forming the metal salt thereof, said acid radical being that of an acid selected from the group consisting of fatty oil acids and resin acids.

13. A process which comprises heating a glyceride having at least one free hydroxyl group with a dibasic acid anhydride at a temperature below the point at which resinification takes place and in proportion to form the half ester, and thereafter reacting the half ester thus formed with a compound of a metal capable of forming the metal salt thereof, said glyceride being selected from the class consisting of fatty oil acid glycerides and resin acid glycerides.

14. A process which comprises heating an excess of glyceride having at least one free hydroxyl group with a dibasic acid anhydride at a temperature below the point at which resinification takes place and thereby forming the half ester of the dibasic acid, and thereafter reacting the half ester thus formed with a compound of a metal capable of forming the metal salt thereof, said glyceride being selected from the class consisting of fatty oil acid glycerides and resin acid glycerides.

15. A metal salt of a monomeric half acid ester of a polybasic acid, said salt being the product obtained by neutralizing with a compound of a metal the reaction product of an acid ester of a polyhydric alcohol, in which the hydrogen atom of at least one hydroxyl group is replaced by a monobasic acid radical, and a polybasic organic acid in proportion to form the acid ester of said polybasic acid, said acid radical being that of an acid selected from the group consisting of fatty oil acids and resin acids.

16. A resinous metal salt of a monomeric half acid ester of a dibasic acid, said salt being the product obtained by neutralizing with a compound of a metal the reaction product of an acid ester of a polyhydric alcohol, in which the hydrogen atom of at least one hydroxyl group is replaced by a monobasic acid radical, and a dibasic organic acid in proportion to form the half ester of said dibasic acid, said acid radical being that of an acid selected from the group consisting of fatty oil acids and resin acids.

17. The resinous metal salt set forth in claim 16 which has an acid number not less than about 75.

18. A resinous metal salt of a monomeric phthalic half acid ester of a glyceride, said salt being the product obtained by neutralizing with a compound of a metal the reaction product of glycerol, in which the hydrogen atom of at least one hydroxyl group is replaced by a monobasic acid radical, and phthalic acid in proportion to form the half acid ester, said acid radical being that of an acid selected from the group consisting of fatty oil acids and resin acids.

19. A resinous metal salt of a monomeric phthalic half acid ester of a fatty oil glyceride, said salt being the product obtained by neutralizing with a compound of a metal the reaction product of a fatty oil acid glyceride having at least one free hydroxyl group and phthalic acid in proportion to form the half phthalic acid ester of said glyceride.

PAUL LAWRENCE SALZBERG.